United States Patent
Galletti et al.

(10) Patent No.: US 9,637,094 B2
(45) Date of Patent: May 2, 2017

(54) ANTI-ROLL STRUCTURE

(71) Applicant: Soluzioninventive srl, Merate (IT)

(72) Inventors: Davide Galletti, Cernusco Lombardone (IT); Ugo Romagnani, Vetto (IT); Sergio Lorenzi, Verdello (IT)

(73) Assignee: Soluzioninventive, SRL, Merate (LC) (IT)

(*) Notice: Subject to any disclaimer, the term of this patent is extended or adjusted under 35 U.S.C. 154(b) by 0 days.

(21) Appl. No.: 14/820,035

(22) Filed: Aug. 6, 2015

(65) Prior Publication Data
US 2016/0039394 A1 Feb. 11, 2016

(30) Foreign Application Priority Data
Aug. 11, 2014 (IT) .............................. VI2014A0213

(51) Int. Cl.
| | | |
|---|---|---|
| *B60T 3/00* | (2006.01) | |
| *B60R 9/00* | (2006.01) | |
| *B60P 3/077* | (2006.01) | |
| *B64F 1/16* | (2006.01) | |

(52) U.S. Cl.
CPC ................ *B60T 3/00* (2013.01); *B60P 3/077* (2013.01); *B60R 9/00* (2013.01); *B64F 1/16* (2013.01)

(58) Field of Classification Search
CPC .... B60T 3/00; B60P 3/077; B60R 9/00; B64F 1/16
USPC .......................................................... 188/32
See application file for complete search history.

(56) References Cited

U.S. PATENT DOCUMENTS

| | | | | |
|---|---|---|---|---|
| 2,316,178 A | * | 4/1943 | Morgensen, Jr. ......... | B64F 1/16 188/32 |
| 2,517,673 A | | 8/1950 | Johnson | |
| 3,647,029 A | * | 3/1972 | Hanley .................... | B60T 3/00 188/32 |
| 3,845,844 A | * | 11/1974 | Woerner .................. | B60T 3/00 188/2 R |
| 3,845,845 A | * | 11/1974 | Geisthoff ................. | B60T 3/00 188/32 |

(Continued)

FOREIGN PATENT DOCUMENTS

| | | |
|---|---|---|
| BE | 764004 | 8/1971 |
| DE | 26 29 543 | 1/1978 |

(Continued)

OTHER PUBLICATIONS

Italian search report dated Feb. 2, 2015 in corresponding Italian Application No. VI 2014A000213.

*Primary Examiner* — Vishal Sahni
(74) *Attorney, Agent, or Firm* — Fattibene and Fattibene LLC; Paul A. Fattibene

(57) ABSTRACT

An anti-roll structure suitable for blocking rolling objects. The anti-roll structure comprises a first support element and a second support element, which consist in, respectively, a lying surface adapted to be placed on a bearing plane and, parallel to the said bearing plane, and a support surface, opposite to the lying surface and inclined with respect to the said lying surface. A junction element is positioned so that it lies on a plane perpendicular to the lying surface and supporting surface. The first and second support element can be placed at a predefined angle with respect to each other by means of the junction element.

14 Claims, 6 Drawing Sheets

(56) References Cited

U.S. PATENT DOCUMENTS

| | | | | |
|---|---|---|---|---|
| 4,109,763 | A * | 8/1978 | Sugino | B60T 3/00 188/32 |
| 4,140,206 | A * | 2/1979 | Yamazaki | B60T 3/00 188/32 |
| 4,421,210 | A * | 12/1983 | Sugino | B60T 3/00 16/268 |
| 4,917,219 | A * | 4/1990 | Henry | B60T 3/00 188/32 |
| 5,465,814 | A * | 11/1995 | Ziaylek | B60T 3/00 188/32 |
| 5,479,794 | A | 1/1996 | Rains | 70/226 |
| 5,513,727 | A * | 5/1996 | Belanger | B60T 3/00 188/32 |
| 2004/0108172 | A1 | 6/2004 | Fox | 188/32 |
| 2009/0194375 | A1 | 8/2009 | Andersen et al. | 188/32 |

FOREIGN PATENT DOCUMENTS

| | | |
|---|---|---|
| DE | 30 27 260 | 2/1982 |
| DE | 102 09 162 | 9/2003 |
| WO | WO 2010/029397 | 3/2010 |

* cited by examiner

200

200

ANTI-ROLL STRUCTURE

FIELD OF THE INVENTION

This current invention relates to a wheel restraint system for vehicles. In particular, this current invention refers to a foldable anti-roll structure, which upon opening, engages the wheel of a vehicle and prevents it from moving, and can be folded when not in use.

BACKGROUND OF THE INVENTION

Blocking or anti-roll elements used to secure a vehicle's immobility when not in use are known from the prior art. These anti-roll elements can be placed behind a rolling object, for example, the wheel of a vehicle in order to exert a pulling force to prevent it from moving. Specifically, the blocking element allows the rolling movement to be transformed into pressure on the ground, and at the same time prevents the anti-roll element from scraping the support base, which may be, for example, a road or the ground. Blocking elements are rather widely used as safety measures for heavy vehicles like trucks, trailers, or semitrailers, whenever there is need to stop the vehicle and keep it immovably docked, as when a semitrailer is detached from its tractor unit, or when a vehicle is parked on a slope or during loading and unloading operations. Blocking elements are also used at auto repair shops to ensure that the vehicle does not move from its position when one of its ends is lifted.

To this end, blocking elements of specific shapes have been developed that when positioned between the wheel and the related zone of contact with the ground, act as anti-roll elements that prevent the wheel from moving, thus impeding the movement of the vehicle. Such a blocking system comprises a flat base suitable to be mounted on the ground, and a support surface to be placed against the rear and/or front part of the wheel of a vehicle.

Blocking elements that are used to ensure the stability of heavy vehicles have to be capable of resisting relatively high mechanical stress. Due to this, anti-roll elements designed for such usage are produced in single blocks. FIG. 1 shows an anti-roll element 1000 in the form of a wedge, known from the prior art. The anti-roll element 1000 has an outer surface 1001 in sheet metal, reinforced by a structural core of solid material 1002. Anti-roll elements similar to that shown in FIG. 1, but in plastic, are likewise known from the prior art.

Such existing solutions, though effective, have various disadvantages. Metallic anti-roll elements are in fact very heavy and as a consequence, difficult to handle. Furthermore, the heavy weight of such blocking elements has a negative impact on the fuel consumption of the vehicle, should the element be transported on the vehicle. In addition, according to the aforesaid solutions, anti-roll structures are voluminous and cumbersome because they are produced in single blocks. Given their volume, it is difficult to find areas of the vehicle suitable for the storage of the single-block anti-roll elements when not in use. The dimensions and weight of the anti-roll structure currently play a particularly important role inasmuch as the space reserved for similar items becomes increasingly reduced, since the current anti-pollution norms impel vehicle manufacturers to use cumbersome and/or heavy apparatus, like catalytic converters, control units that monitor consumption, tanks and similar items. Once installed, these apparatus take up a lot of the available storage space for anti-roll structures like, for example, wedge-like chocks and similar tire stoppers. In the case of heavy vehicles like trucks and trailers, the problem of available space is mitigated by the dimensions of the vehicle and the chock can be stored in a specific wheel chock holder that can be set below the caisson or chassis of the trailer. On the other hand, to carry such chocks in smaller vehicles, like vans or other types of vehicles used to transport people, implies a remarkable loss of loading space. This means that anti-roll elements are often not available in the last types of vehicles even if their utility would be vital in blocking the vehicle when changing a tire or even in cases when the vehicle is parked on a slope.

Furthermore, the chock holder in which the anti-roll element is stored when not in use during a trip, must be big enough for the element to fit in. The bigger the anti-roll elements are, the more cumbersome the chock storage structure will be, with related costs because of the dimensions. Furthermore, conventional chock holders can be arranged only along a vertical direction since the chock is kept in place in the storage structure only by force of gravity. As a consequence, a chock stored in a conventional holder has to be taken out vertically, and so, with respect to the holder it is taken out in a direction perpendicular to the ground. This implies that chock holders have to be arranged in a way as to provide sufficient space to completely extract the chock with an upward movement, thus limiting the options of the areas of the vehicle where the chock holders point can be set.

To get around this inconvenience, foldable anti-roll structures or chocks have been developed, so as to reduce the volume when not in use. FIGS. 2A and 2B show the schematic diagram of a foldable chock, known from the prior art, in an open and closed configuration respectively. The anti-roll structure 2000 has a lower lying surface 2003 that can be positioned on the ground, with a lying surface 2001 to be placed behind and/or in front of a tire, and a rear support or shoulder 2002. The shoulder 2002 and the lying surface 2001 are attached to the ends of the lower lying surface 2003 in a rotational manner. In the open position of the anti-roll structure 2000, the free end portions of the shoulder 2002 and the lying surface 2001 can be fixed to each other, for example by means of a hook, in order to form a wedge.

The aforementioned solutions referring to FIGS. 1, 2A and 2B present however, some disadvantages, resulting moreover in reduced functionality and safety. Especially foldable solutions like those described in FIGS. 2A and 2B may be inadequate in terms of structure since they may collapse and close while in use, allowing the tire to move freely. Besides, in these types of solutions, due to their structure, these devices can stress the tire locally when the chock itself is in place. Another defect of the conventional foldable chock is that the lying surface 2001 placed against the tire, has a reduced structural function and the weight of the tire is essentially discharged onto the rear shoulder 2002, and on the lower lying surface 2003 which, as a consequence, must be designed to be very sturdy and heavy. In particular, in order to let the weight be discharged through the rear shoulder 2002, onto the base of the chock 2002 and thus onto the ground, the latter has to be sufficiently sturdy. Furthermore, a chock according to the configuration shown in FIGS. 2A and 2B discharges the weight of the rolling object essentially at the height of the vertex between the base 2003 and the rear shoulder. On one hand, concentrating the weight on such a limited surface implies that the lying surface on which the chock lies is subjected to great pressure and may be damaged. On the other hand, limiting the point of discharge to only one zone implies the risk that should the support point collapse, for example, in a sandy terrain or similar ground, the chock would no longer be able to carry out its function.

The foldable solutions furthermore have proven to be difficult to handle, due to both the storing system under the wheel, and also the removal, closure and re-storing in the relevant chock holder.

In the final analysis, albeit structural and single-block wheel chocks of the type shown in FIG. 1 possess the necessary structural solidity to prevent the movement of tires of heavy vehicles like trucks, and thus respond to needs, they are problematic when not used, being bulky and difficult to handle and store. On the other hand, while the foldable chocks were created to respond to these problems, and occupy a decisively reduced volume compared to the single-block chocks when not in use, these have proven to have functional defects in their primary usage as wheel chocks.

This current invention has the objective of overcoming and resolving the problems associated to the aforementioned solutions known in the prior art. This current invention specifically aims to provide an anti-roll structure that is able to ensure the stability required to safely block the tires of a parked vehicle and which at the same time is light, storable and compact when not in use.

SUMMARY OF THE INVENTION

The subject of this current invention is solved by the independent claims. Advantageous embodiments of this current invention are the subject of the dependent claims.

This current invention refers to an anti-roll structure adapted to block wheels. The anti-roll structure comprises a first support element and a second support element that consist in, respectively, a lying surface adapted to be placed on a bearing plane; with said lying structure being parallel to said bearing plane, and a support surface opposed to the lying surface, and inclined with respect to said lying surface. The anti-roll structure comprises a junction element lying on a plane perpendicular to the lying surface and to the supporting surface wherein the first support element and the second support elements can be placed at a first predefined angle with respect to each other by means of the junction element.

Advantageously, the junction element can be a pivot element; and the first and the second support elements are fastened to each other by means of the pivot element and the both the first and the second support elements are pivotable with respect to each other about a rotation axis of the pivot element by the first predefined angle.

The invention refers furthermore to a storing structure in which the anti-roll device can be placed when not in use. The storage structure comprises a first and a second side surfaces arranged parallel to each other and at a predefined distance from each other. Fastening elements are arranged on a rear side of the storage structure, suitable to fasten the storage area to a part of a vehicle so that the first and second side surfaces are perpendicular to said part of the vehicle. A supporting bar is arranged on an inner face of the first and second side surfaces of the storage structure and extends lengthwise from the rear to a front side of the storage area opposite the rear side. The predefined distance herein is such as to fittingly house the closed anti-roll structure between the first and second side surfaces. In said space each supporting bar suitably engages with a corresponding groove of the anti-roll structure so as to support it when it is inserted in the storage structure This invention regards also includes the anti-roll structure and the storage structure.

BRIEF DESCRIPTION OF THE DRAWINGS

The attached figures are incorporated in the description and form part of the same in order to illustrate different types of embodiment of this current invention. These figures together with the description serve to explain the principles of the invention. The figures are provided for the sole purpose of illustrating preferred or alternative examples of how the invention can be realized and used, and are not to be construed to limit the invention only to the embodiments illustrated and described. Additional characteristics and advantages will be apparent from the following, more detailed description of the different embodiments of the invention, as illustrated in the annexed figures, in which like numerals refer to like elements.

DETAILED DESCRIPTION OF THE INVENTION

The following paragraphs describe different examples of embodiments of this current invention.

The invention is based on the observation that anti-roll structures currently available and used to ensure the immobility of a vehicle like a heavy truck, a trailer or a passenger-bus, are cumbersome, often heavy and inconvenient to handle. Light and collapsible chocks can present faults at structural level which make them risky and/or inconvenient to use.

The solution proposed by this current invention aims at providing a foldable anti-roll structure, which has solved the deficiencies typical of single-block anti-roll elements, and that at the same time is able to guarantee the immobility of the vehicle when not in use without damaging the tire.

Figure 1:
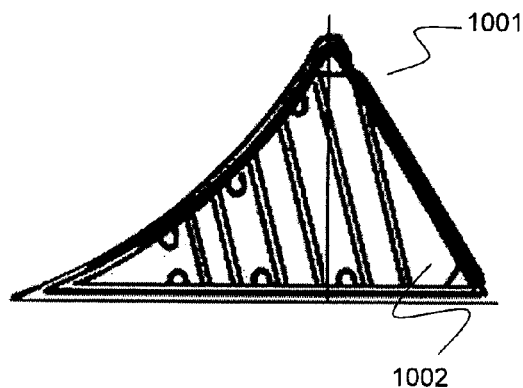
FIG. 1 shows an anti-roll structure 1000 in the form of a chock known in the prior art.
Figure 2A:
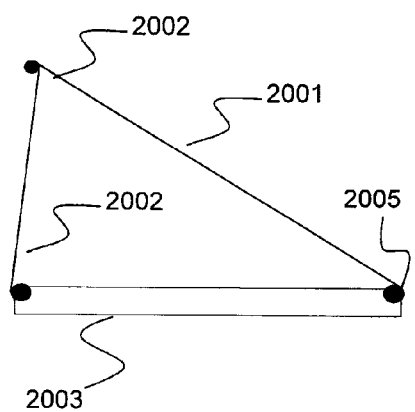
FIGS. 2A and 2B respectively schematically show a foldable anti-roll structure in an open and closed configuration, known in the prior art.
Figure 2B:
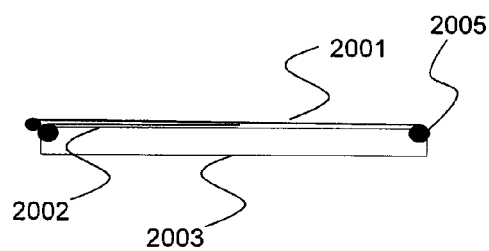
Figure 3:
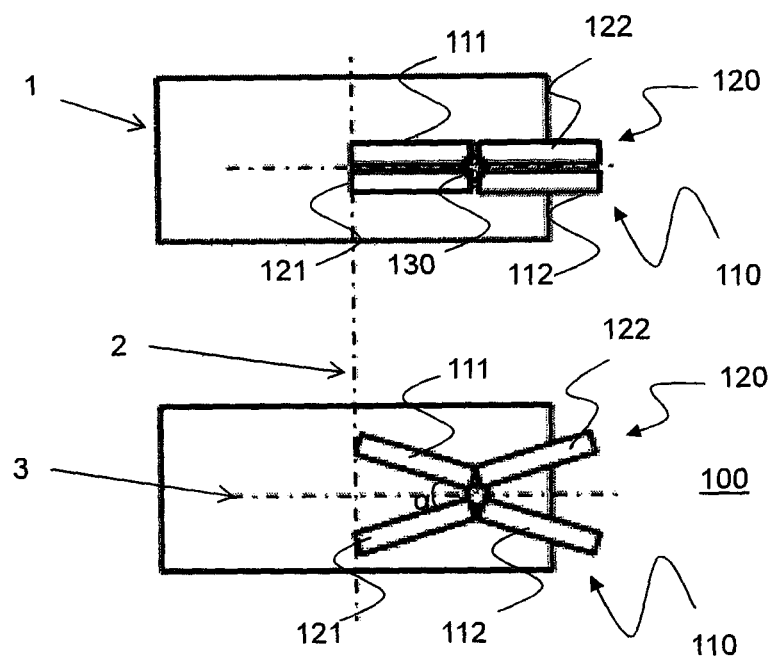
FIG. 3 shows a view from below of anti-roll structure 100 as used according to this current invention.

FIG. 3 shows an example of a configuration of the anti-roll structure according to this current invention. This foldable anti-roll structure comprises a first support element and a second support element 110, 120 respectively with a lying surface 115 essentially flat and designed to be placed on a bearing plane. Said lying surface is parallel to the bearing plane and support surface 114 opposed to the lying surface 115 and inclined with respect to said lying surface. The two support elements 110 and 120, can be fixed together at a first predefined angle with respect to each other in a reversible manner by means of a junction element 130.

Advantageously, the first and second support elements 110 and 120, can be fastened in a rotational way with respect to each other at the first predefined angle about a rotation axis of the pivot element 130. To this end the junction element could, for example, be configured as a pivot pin and the first and second support elements 110 and 120, are attached to one another by means of the pivot element. Said pivot element 130 lies on a plane perpendicular to the lying surface 115 and the support surface 114. The plane as such is also perpendicular to the pivoting axis of a rolling object when the anti-roll structure is set in place against the rolling object. The first and second support elements 110 and 120, can rotate with respect to each other around a rotation axis of the pivot element 130 by the first predefined angle in a plane parallel to the lying surface of the first and second support surface.

In particular, the two support elements 110 and 120 can be attached in a pivotable manner by means of at least one pivot or hinge positioned at a midline lying on a plane forming an angle with the support surface. The angle between the midline and the support surface may beneficially be less than 90° so that the midline is oriented towards the wheel or even orthogonal to the axis of the wheel.

FIG. 3 shows a view from below of an anti-roll structure 100 during use, according to this current invention. The first support element 110 can, in an advantageous embodiment, be a single-block and include an essentially flat support surface and be positioned on a lying surface, such as the ground or road, and a support surface 114 opposed to the lying surface 115. The second support element can be configured like the first support element and have the same profile and dimensions.

The first and second support elements 110 and 120 comprise respectively, a front end portion 111, 121 and a rear end portion 112, 122. The junction element 130, which can be made as a pivot pin is positioned between the front end portion 111, 121 and rear end portion 112, 122, of the first and second support elements 110 and 120. The front and rear end portions 111, 112 and 121, 122 can advantageously be made of a single block, where the front end portion 111, 121 is misaligned with respect to the rear end portion 112, 122 in a predefined offset. According to this configuration the front end portion 111 and the rear end portion 112 of the first support element 110 and the front end portion 121 and the rear end portion 122 of the second support element 120 are respectively misaligned with respect to the longitudinal axis of the anti-roll structure 100. In particular, the support elements 110 and 120 are shaped in such a way that, in the closed configuration of the anti-roll structure 100, the front end portion 111 of the first support element 110 is aligned to the rear end portion 122 of the second support structure 120 along a direction parallel to the longitudinal axis of the anti-roll structure 100. Likewise, the front end portion 121 of the second support element 120 is aligned to the rear end portion 112 of the first support element 110 along a direction parallel to the longitudinal axis of the anti-roll structure 100. The first and the second single-block support elements are attached to one another through the pivot element, which may be for example a pivot pin 130 positioned between the front end portions 111, 121 and the rear end portions 121, 122, and which extends along from the surface of the lying surface to the support surface.

According to the aforementioned configuration the anti-roll structure can be opened and closed by rotating the first support element 110 with respect to the second support element 120 around an axis of the pivot pin so that in an open position the anti-roll structure has an X section. In an open configuration the first support element 110 is oriented at a predefined angle a with respect to the second support element 120 around the rotation axis of the pivot pin. The opening angle is chosen to guarantee the greater bearing surface possible without compromising the solidity of the anti-roll structure 100. The advantageous angle opening a can be chosen in the range between 10° and 120°. An angle a of about 30° between the first and second support elements 110 and 120 allows the open anti-roll structure 100 to have an optimal ratio between structural sturdiness and bearing plane surface 115. Every angle value comprised in the aforesaid range guarantees however a structural solidity that suffices to support the pressure exercised, for example, by the tire of a vehicle, preventing in this way, the anti-roll structure from collapsing.

In an advantageous variation of this current invention, the first and second support elements 110 and 120 could be mounted without the use of a pivot pin. According to this type of embodiment, the first and second support elements 110 and 120 could have, respectively, a first and second complementary groove or cavity. For example in the first support element the first cavity may extend from the bearing plane surface 115 toward the direction of the support surface 114, while the second cavity in the second support element can extend from the support surface 114 toward the direction of the bearing plane surface 115. In an open configuration the first support element 110 can be inserted in the second groove of the second support element 120 so that the first support element is positioned and fixed at a predefined angle with respect to the second support element. According to this type of embodiment, the junction element 130 is given by the portion of the first and second support elements corresponding to the first and second complementary grooves.

In a further development of this current invention, the first support element 110 is not made in a single block but the front and rear end portions 111 and 112 can be independent and attached together through a pivotable hook, like a hinge. The same applies for the second support element 120 and the front and rear end portions 121, 122 of the second support element. According to this configuration the first and second support elements 110, 120 are set parallel to one another and attached in such a way that the front end portions 111 and 121 can rotate with respect to one another at angle a. Likewise, in an independent way from the front end portions, the rear end portions 121, 122 can pivot with respect to one another by angle α. According to this type of embodiment of this current invention the anti-roll structure can open with a butterfly flap mechanism. In this advantageous embodiment, the first and second support elements 110, 120 are two separable elements that can be joined together by means of a fixing element that runs along a midline on a plane perpendicular to the support surface 114 and the lying surface 115. In particular, the plane perpendicular to the support surface 114 and the lying surface 115 according to the configuration of the anti-roll structure of this current invention is the plane perpendicular to the rotation axis of the rolling object when the anti-roll structure is positioned.

An alternative embodiment is that the junction element 130 can be positioned at an end of the first and second support elements 110, 120 so that these can be opened like a compass at the predefined angle. According to this configuration the front end portion 111 and the rear end portion 112 of the first support element 110 and the front end portion 121 and rear end portion 122 of the second support element 120 are respectively aligned to the longitudinal axis of the anti-roll structure 100.

According to an advantageous configuration of the anti-roll structure the pivoting element 130 is set in proximity with a central point of the anti-roll structure and is inclined with respect to the lying surface 115 at a second predefined angle.

Figure 4:
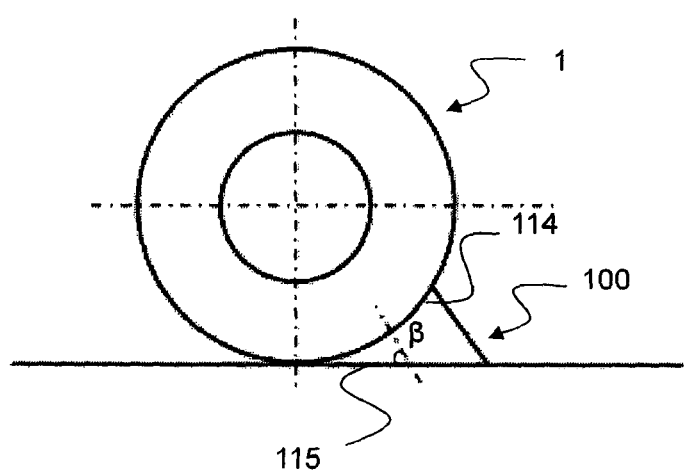
FIG. 4 shows a side view of an anti-roll structure 100 as used according to an embodiment of this current invention.

In an advantageous embodiment of this current invention, the anti-roll structure 100 may have an essentially wedge-like profile, as shown in FIG. 4 which gives a side view of an anti-roll structure 100 in use according to an embodiment of this current invention.

In this embodiment the front end portions 111, 121 of the first and second support elements 110, 120 are shaped like two wedges that are essentially placed parallel to one another when the anti-roll structure is closed. The rear and front end portions instead have a profile that allows the rear end portion 122 of the second support element to couple in a precise way, with the front end portion 111 of the first support element 110 when the anti-roll structure 100 is in the open configuration. The first and second support elements 110, 120 are held together by the pivot pin 130 or hinge that acts as a pivot. In order to adapt itself better to the rolling object to be blocked, the support surfaces of the first and second support elements 110, 120 which come in contact with the rolling object 1, have a curved profile, and a curvature radius that allows the anti-roll structure 100 to adapt itself better, in an open configuration, to the profile of the rolling object 1. To follow, a wheel will be taken as example to simplify the illustration. It is understood however, that the anti-roll structure described up to now and hereafter, can be used to block the rolling of any rolling object, such as cylinders, rollers and other similar items, even if they are not perfectly round, like ellipsoids and similar objects.

During usage, the anti-roll structure 100 is placed in open configuration below the wheel 1 in a way that the tips of the front end portions 111 and 121, which may benefit from a wedge-like profile, are set at the wheel's contact point with the ground. The junction element 130, in the form of a pivot pin, for example, can be placed in proximity with a central point of the anti-roll structure. In addition, or alternatively, the junction element 130 can be inclined with respect to the lying surface 115 at a second predefined angle. In an advantageous way, the pivot pin 130 can be positioned on a midline lying on a plane orthogonal to the axis of the wheel. This plane which is orthogonal to the wheel's axis corresponds to the plane perpendicular to the lying surface 115 and the support surface 114. The midline can be positioned at the centre of the anti-roll structure and oriented in a way so as to be perpendicular to the lying surface of the anti-roll structure.

Alternatively, the midline may be inclined at a predefined angle β compared to the lying surface. Advantageously, the midline or the junction element, i.e. the pivot pin 130, can have an inclination of 60° for example, with respect to the lying surface, meaning, 30° with respect to the vertical axis at the lying surface. The pivot element can be inclined with respect to the lying surface 115 so as to touch with a first end portion, the rolling object to be blocked and with a second end portion, the lying surface. Advantageously, the pivoting element can be oriented in order to be perpendicular to the tangent at a point of the rolling object. In this way, the pivot pin 130 can be perpendicular to the surface of the wheel 1 at the point where it rests on the support surface at the height of the pin, in a way that the anti-roll structure 100 can better respond to the structural stress it is subjected to. In the configuration where the pivot pin comes in contact with the wheel with a first end portion, and the ground with a second end portion opposite the first, the pivot pin also assumes the function of securing the anti-roll structure and wheel 1 to the ground.

To improve the securing function, the junction element or pivot 130 may consist of a first anchoring element formed on the second end portion, and said first anchoring element can suitably be anchored to the lying surface. The anchorage element may be for example, a prop-up element or a chock made to sink into the ground. Furthermore the anti-roll structure 100 could be configured in such a way that the lying surface 115 of the first and second support elements 110, 120 will include, on a face turned upwards towards a lying surface like the ground, at least another anchorage element 240 (not shown), called a second anchorage element, visible in FIG. 5 onwards, and especially identified as 240 in FIG. 8, which is designed to be anchored to the lying surface. The second anchorage element 240 can be a prop-up element or a chock adapted to be stuck into the ground. An example of an anchorage element will be illustrated with reference to FIG. 5 onwards.

In the anti-roll structure 100 the first and second support elements 110, 120 can have the advantageous feature of a grip element (not shown) made to be gripped by hand when the support structure is in a closed configuration. An example of a grip element is shown from FIGS. 5 onwards. The anti-roll structure 100 can furthermore have an advantageous feature that includes an elastic support, set between the first and second support elements; and which is made to accompany the rotation of the first support element with respect to the second support item. The elastic element could be, for example, a spring or a piston, placed between the first and second support elements 110, 120.

Figure 5:
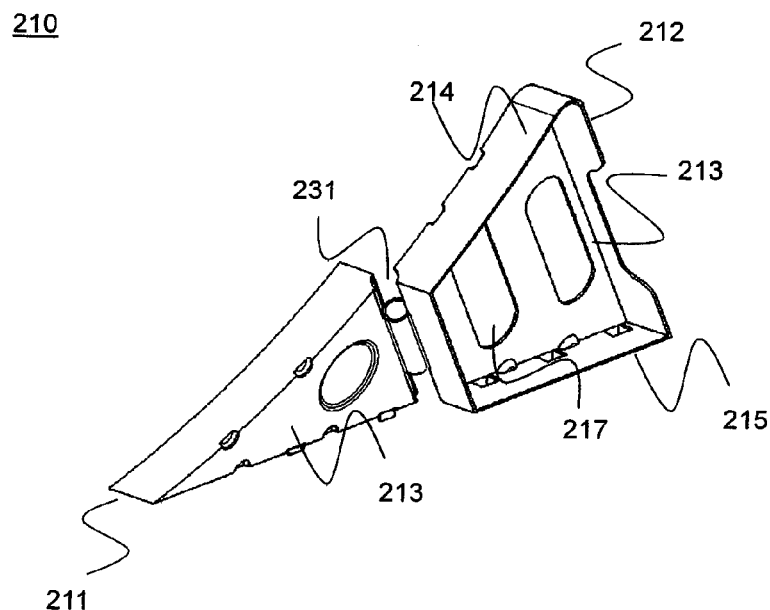
FIG. 5 gives a perspective view of a detail of the anti-roll structure according to this current invention and in particular shows a first support element according to this current invention.

FIG. 5 shows a first support item 210 in an anti-roll structure 200 (not shown entirely) according to an advantageous development of this current invention. The following description referring to the first support element shown in FIG. 5 can be applied to the second support element 220, which is structurally identical to that of the first support element 210 and the profile of which is symmetrical to it, with the sole exception of the hinge, which will have to be complementary to the one shown. Moreover, the characteristics already shown with reference to the anti-roll structure shown in FIGS. 1 to 4 are compatible with and implementable on the anti-roll structure 200 and will not be described again.

The anti-roll structure 200 meets the requirements of lightness and easy handling due to the fact that the first and second support elements 210, 220 can be rotated around a pivot pin 231 placed between a front end portion 211, 221 and a rear end portion 212, 222 of the support elements 210, 220 as described with reference to FIGS. 1 to 4 and thus offer, in an open position, a lying surface for the wheel comparable to that offered by conventional chocks. This allows the reduction of the lateral dimension of the first and second support elements with respect to the lateral dimension of the conventional wheel-blocking chocks. This reduction in dimension can be at an average of about two-thirds, since an anti-roll structure or an open chock that is 250 mm wide can, once closed, measure about 85 mm. This data is obviously approximate, and typical of a particular embodiment of the anti-roll structures 100, 200 and have the objective of clarifying the ratios between the dimensions of an open and closed chock. It is understood, however, that the anti-roll structure can have other measurements, which can be chosen according to its intended use. The structural capacity of the anti-roll structure is given by the intrinsic sturdiness of the first and second support elements 210, 220, which may have a reinforced core 213 or openings 217. In fact, the solution offered by this current invention does not require the folding of the support surface 214 on lying surface 215 to bring the anti-roll structure 200 to a closed position, as in the case of conventional foldable chocks, which instead require the part to have no internal volume since otherwise the opening and closing movements would be hindered.

The first support element 210 includes, between the front end portion 211 and rear end portion 212, a first hollow portion of a pivot element 231. The first portion of the pivot element 231 can be configured in the form of a pivot pin portion, such as a part of a hinge. Other embodiments of the pivot pin and therefore of the portions of this pivoting element that would allow the rotation of the first and second support elements parallel-wise to the lying surface are obviously feasible and compatible with this current invention. In the first portion of an element or pivot pin 231 in the embodiment shown in FIG. 5, a circular crown section adapted to be attached to a counterpart (not shown) formed between the front end portion 221 and the rear end portion 222 of the second support element 220. The counterpart could comprise a second and a third portion of the pivot pin (not visible) with crown sections and distanced between them in the direction perpendicular to the longitudinal axis of the second support element 220.

Figures 6, 7:
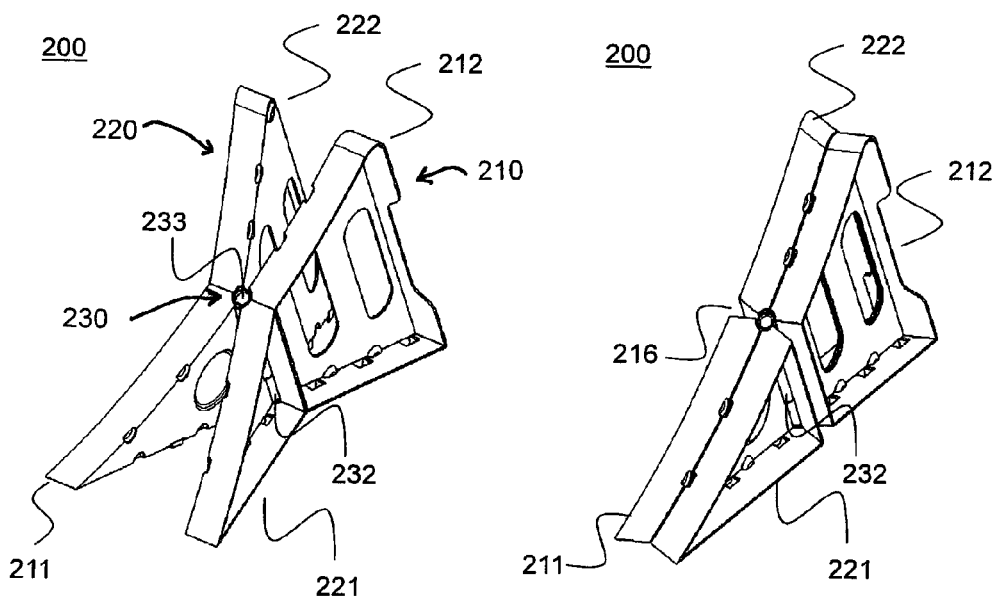
FIG. 6 gives a perspective view of the anti-roll structure 200 according to this current invention in an open configuration.
FIG. 7 shows a perspective view of the anti-roll structure 200 according to this current invention in a closed configuration.

FIGS. 6 and 7 show an anti-roll structure 200 in an open and closed configuration respectively. The first pivot pin 231 portion is positioned between the second and third portion of pivot pin 232 and secured to them through a securing pin 233 inserted in a cavity of the pivot pin portion. Advantageously, the pivot pin portions from the first to the third 231, 232 and securing pin 233, can be configured as a hinge through which the first support element 210 and the second support element can rotate around a rotation axis of the pivot pin 230 so that the first support element 210 and the second support element may rotate around a rotation axis of the pivot pin 230 so that the first support element 210 can rotate by a predefined angle with respect to the longitudinal axis of the anti-roll structure 200 and the second support element 220 can rotate in the opposite direction compared to the longitudinal axis of the anti-roll structure by said predefined angle. Through the rotation of the first and the second support elements, 210 and 220 with respect to the longitudinal axis of the support structure 200, in an open configuration of the support structure 200, the front end portion 211 of the first support element 210 is rotated by said predefined angle with respect to the longitudinal axis of the anti-roll structure, while the rear end portion 212 of the first support element is rotated in the opposite direction with respect to the front end portion 211. The angle by which the rear end portion 212 of the first support element is rotated with respect to the rear end portion 222 of the second support element, may have the same value as the predefined rotation angle of the front end portions, in cases where the first and second support elements respectively, are formed by one block. Alternatively, if the front portions 211, 221 and the rear portions 212, 222 of each support element are mutually pivotable, the rotation angle by which the rear end portion 212 of the first support element is rotated with respect to the rear end portion 222 of the second support element, can have a different value with respect to the predefined rotation angle of the front end portions.

The pivot pin 230, inclusive of the pivot pin portions from the first to the third 231, 232 and the securing pin 233, can be advantageously configured as a hinge, placed between the front and rear end portions of the first and second support elements 210, 220, around the axis of which the first and second support elements can rotate with respect to one another.

In an advantageous embodiment, the securing pin 233, inserted in the pivot pin portions from the first to the third 231, 232 is configured in a way as to be placed between the wheel 1 (not shown in the FIGS. 5 to 7) and a lying surface, such as a road or ground, so as to be oriented along a direction that essentially coincides with the radius of the wheel 1. In other words, in an advantageous embodiment, the securing pin is oriented towards the midline of the wheel. Advantageously, the pin can be inclined by 30° with respect to the vertical axis of the lying surface or in an equivalent way, by 60° with respect to the lying surface. This inclination allows the exploitation of the pivot pin 230 as a structural element able to further increase the structural sturdiness of the anti-roll structure 200. Obviously, embodiment methods in which the pivot pin is inclined at angles other than 30° are feasible. For example, the pin could be inclined at an angle ranging from 10° to 90°, and even from 10° to 80°.

The securing pin 233 advantageously includes, on an end portion turned towards the lying surface, a first anchoring element formed on the second end portion. Said first anchoring element (not shown) could be a prop-up element or chock to be stuck into the ground on which the anti-roll structure is docked.

The support elements 210, 220 can moreover have a form in which, in a closed configuration of the anti-roll structure 200, between the front end portion 211 of the first support element 210 and rear end portion 222 of the second support element 220, a groove 216 is created which extends from the lying surface 215 to the support surface 214. The V-section groove is formed by a face of the front end portion 211 turned towards a side of the rear end portion 222 and inclined at an angle with respect to it. This groove 216 may have a V section. A V-section groove allows for easy rotation of the first support element with respect to the second support element and allows the front end portion 211 of the first support element 210 to lay on the rear end portion 222 of the second support element 220, when the anti-roll structure is open. Moreover, in a closed position of the anti-roll structure, the V section is able to engage a corresponding supporting bar included in a storage structure (shown in FIGS. 12 and 13) so as to be supported and secured to the storage structure.

FIG. 7 gives a perspective view of the anti-roll structure 200 according to this current invention in a closed configuration, in which the first and second support elements 210, 220 are made to rotate towards one another so that the front end portion 211 of the first support element 210 lies on the front end portion 221 of the second support element 220 and is aligned with the front end portion 222 of the second support element 220 along a direction parallel to the longitudinal axis of the anti-roll structure. Likewise, the front end portion 221 of the second support element 220 lies on the front end portion 211 of the first support element 210 and is aligned with the front end portion 212 of the first support element 210 along a direction parallel to the longitudinal axis of the anti-roll structure. Once the anti-roll structure 200 is folded, its compactness is the result of the spatial tightness of the first and second support elements 210, 220.

Figure 8:
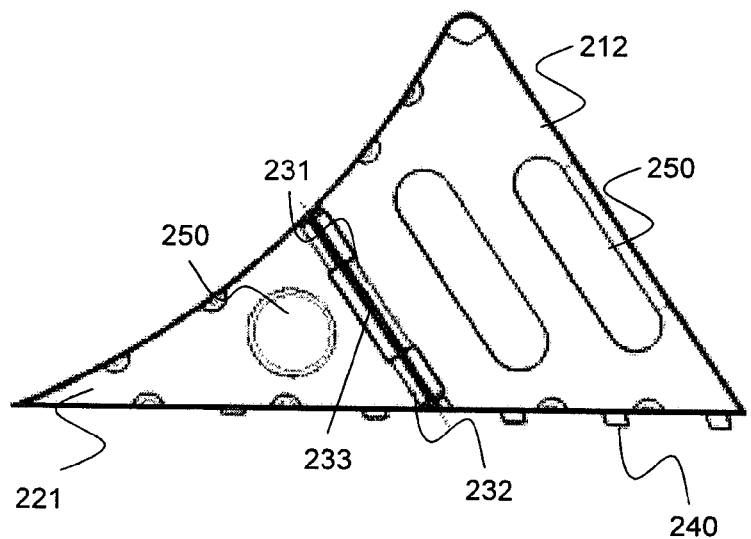
FIG. 8 shows a side view of the anti-roll structure according to this current invention.
Figure 9:
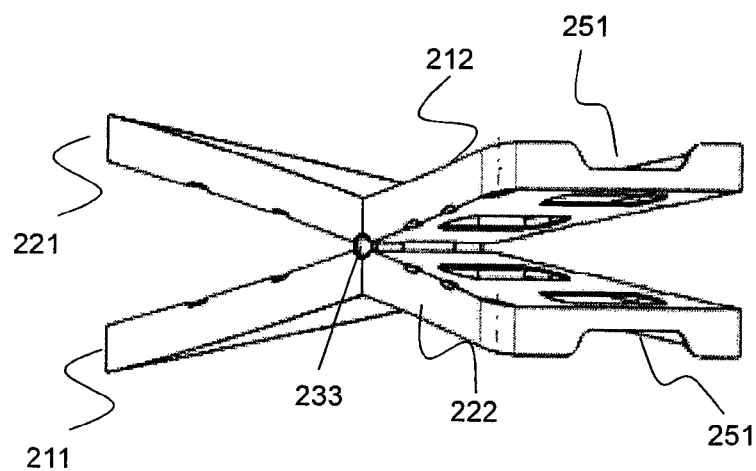
FIG. 9 shows a view from above of the anti-roll structure in open position.

FIG. 8 shows a side view of the anti-roll structure 200 according to this current invention. A top view of the anti-roll structure in open position is shown in FIG. 9. The anti-roll structure 200 presents a wedge-like profile that resembles the conventional wheel restraining chocks. FIG. 8 shows one side in which the front end portion 221 is visible and shows also the side of the second support element 220. The front end portions 211, 221 of the first and second support elements 210, 220 comprise a wedge-like tip. The pivot 230 is formed on a rear surface of the front end portion, inclined with respect to the lying surface 215, which joins the lying surface 215 to the curved support surface. The rear end portion 212 of the first support element 210 is aligned with the front end portion 221 of the second support element 220 and has a profile that is essentially trapezoidal, in which a face of the trapezoid is of such a dimension that it can join with the rear surface of the front end portion 221. The support surface of the rear end portion 222 has such a curvature that it joins with no need for junction elements or steps to the support surface of the front end portion 211, 221. To further lighten the anti-roll structure, in the internal core 213 of the first and second support elements 210, 220 one can procure openings 250 of variable shapes and dimensions.

The rear surface of the first and second support elements 210, 220 has on its edge a cavity or groove 251 near an oblong opening 250 in the core 213. The groove 251 together with the corresponding opening 250 form a grip point or handle in the closed configuration of the anti-roll structure. This grip point in the rear part of the first and second support elements ensures an ergonomic use and the easy handling of the anti-roll structure.

Even if in FIGS. 8 and 9 the grip handle is formed by the grooves 251 and openings in the rear part of the anti-roll structure 200, it is understood that any other equivalent solution would be in line with the basic idea of this current invention. For example, it would be possible to apply a grip handle on the rear surface of the first and second support elements 210, 220.

On the lying surface 215 one could form, on one face turned toward a lying surface, at least a second anchoring element 240 that can be anchored to the lying surface.

A further development of the anti-roll structure according to this current invention could include a spring (not visible) positioned between the first and the second support elements 210, 220, for example, between the rear end portions 212, 222 of the first and second support elements. The spring could be opportunely calibrated in order to accompany the opening or the rotation of the first and second support elements with respect to the longitudinal axis of the anti-roll structure once the grip handle is loosened. The elastic force of the spring could then be calibrated so that it can be easily pressed with one hand gripping the groove 251 found on the first and second support elements to make these come closer and reclose the anti-roll structure. Should this spring be present, the anti-roll structure could include a fastener or safety catch that could keep the first and second support elements 110, 120 in closed position. The safety catch could include a first closing element (not shown) formed on the first support element, preferably on a rear side joined to the lying surface and the support surface of the first support element 110. The first closing element can also be made to hook on firmly to a second closing element (not shown) formed on the second support element in correspondence with the first closing element, preferably on a rear side joining the lying surface and the support surface of the second support element 120.

Figure 10:
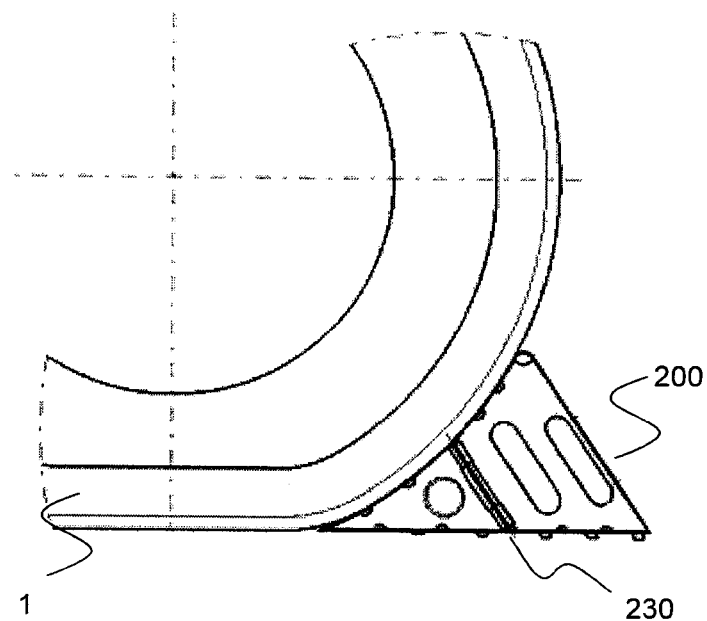
FIG. 10 shows a side view of the anti-roll structure according to this current invention.
Figure 11:
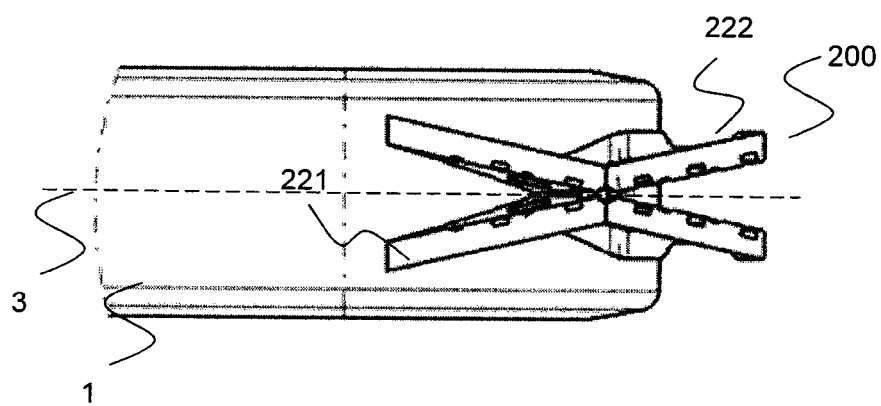
FIG. 11 shows a view from below the anti-roll structure according to this current invention.

FIGS. 10 and 11 give a side view and one from below, respectively, of the anti-roll structure 200 according to this current invention. The functioning of the anti-roll structure 200 repeats, in its basic points, the functions of the structure 100 as described and referred to in FIGS. 2 to 4, the description of which will not be repeated for the sake of simplicity. In the anti-roll structure 200 in open position, the first support element 210 is rotated with respect to the second support element 220 around the pin 230. The pin 230 is positioned at about half the length of the anti-roll structure on the median axis of the latter and extends along the lying surface at the support surface of the anti-roll structure 200. According to this configuration in open position, the anti-roll structure 200 has an X-shaped lying surface. In an open configuration the first support element 210 is oriented at a predefined angle with respect to the second support element 220 or to a predefined angle a/2 with respect to the longitudinal axis 3 of the anti-roll structure 200, in a plane parallel to the lying surface of the anti-roll structure. The opening angle is chosen in such a way as to ensure a bigger lying surface without compromising the solidity of the anti-roll structure 100. Advantageously the opening angle α/2 can be chosen from the range of 5° to 60°. An angle α/2 of about 15° between the first support element 210 and the longitudinal axis of the anti-roll structure 200, and between the second support element 220 and the longitudinal axis of the anti-roll structure 200 allows the open anti-roll structure 200 to have an optimal ratio between the lying surface and structural sturdiness. Each angle value included in the aforementioned range guarantees however, adequate structural solidity to support the pressure exercised, for example, by the tire of a vehicle, thus preventing the anti-roll structure from collapsing.

In an advantageous embodiment of this current invention, the front and rear end portions 211, 212 and 221, 222 can be distinct parts, pivoting among themselves and secured in a rotational manner by means of one or more securing pins. In this case the anti-roll structure can be configured so as to be opened and closed like butterfly wings as already described earlier in the anti-roll structure variation in FIG. 3.

In another advantageous embodiment of this current invention, the anti-roll structure can have an essentially wedge-like profile, as illustrated in FIG. 10. In this embodiment, the front end portions 211, 221 of the first and second support elements 110, 120 have the shape of two wedges which are essentially set parallel to one another when the anti-roll structure is closed. Furthermore, the rear and front end portions have a profile that allows the rear end portion 222 of the second support element 220 to couple in a precise way with the front end portion 211 of the first support element 210 when the anti-roll structure 200 is in the open configuration. To this end, a face of the front end portion 211, 221 oriented towards the rear end portion 212, 222 and a face of the rear end portions 212, 222 oriented towards the front end portions 211, 221 have an inclination that allows the front end portions 211, 221 to lie on a face of the rear end portions 212, 222.

When in use, the anti-roll structure 200 is positioned in the open configuration below the wheel 1 as shown in FIGS.

10 and 11, so that the tip of the front end portions 210 and 220, is next to the wheel's contact point with the ground. Advantageously, the support pin 230 can be positioned on a midline lying on a plane orthogonal to the axes of the wheel, i.e. on a plane orthogonal to the lying surface 215 and to the support surface 214. This midline can be positioned at about the centre of the anti-roll structure, along the longitudinal axis 3 and inclined at a predefined angle with respect to the lying surface. Advantageously, the midline and thus the pivot pin may have an inclination of 60° with respect to the lying surface, i.e. 30° from the vertical axis of the lying surface. In this way, the pivot pin 230 is in a position substantially perpendicular to the surface of the wheel 1 at the point where the wheel 1 lies on the surface support near the pin, in such a way that the anti-roll structure 200 can best respond to the structural stress it is subjected to. Alternatively, the pivot pin 230 can be oriented downwards, or in other words, perpendicular to the lying surface of the anti-roll structure.

Figure 12:
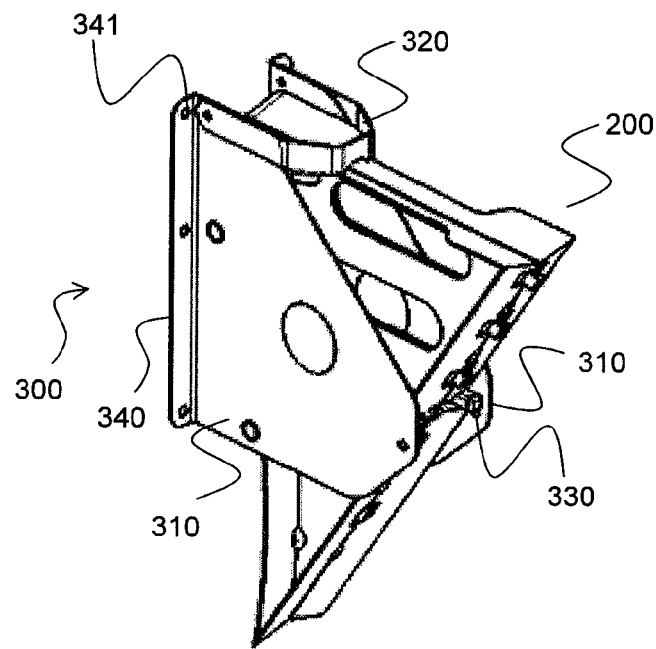
FIG. 12 shows the anti-roll structure in closed position and stored in a relevant storage structure.

This current invention refers also to a storing structure or wheel chock holder 300 where the anti-roll structure is stored when not in use. FIG. 12 shows the anti-roll structure 200 in closed position stored in a relevant storage structure 300. This storage structure 300 comprises a first and a second wall or lateral surface 310 arranged parallel to one another and at a predefined distance from each other. The predefined distance is such as to house the closed anti-roll structure. For example, the anti-roll structure could be inserted in a way that the tips of the front end portion and the second support element face downward, or towards a lying surface like the ground. Obviously, in other alternative configurations the anti-roll structure could be inserted in the storage structure in a way that it is not oriented downwards but at an angle with respect to a normal direction and the lying surface. For example, the anti-roll structure could be inserted horizontally. Moreover, the predefined distance between the first and the second side surface is such as to precisely fit into a closed anti-roll structure. Fastening elements 341 are arranged on one rear side 340 of the storage structure 300, and are used to secure the storage structure to a portion of a vehicle so that the first and second lateral surfaces are perpendicular to that part of the vehicle. The chock storage structure 300 includes a securing or stopper bar for the support bar 330 set on one internal side of the first and second side surfaces 310 of the storage structure 300 and which extends, at least partly, from the rear side 340 to a front side of the storage structure 300. The supporting bar 330 is adapted to engage or fit in the V-shaped grooves 216, illustrated in FIG. 7, of the anti-roll structures 100, 200 when the anti-roll structures are inserted in the storage grooves.

Advantageously, a face of the anti-roll structure, for example, the lying base, can be fastened to the supporting bar when the anti-roll structure is put into the chock storage structure. In this way, the supporting bar 330 is suitable to support the anti-roll structure when it is stored in storage structure 300.

Advantageously, the predefined distance between the first and the second side walls 310 can measure between 85 mm and 87 mm so as to fittingly receive a closed anti-roll structure which is about 85 mm thick. This is just an example and the value is approximate. It is clear, however, that any other value for the predefined distance could be used with the same result. Generally, the predefined distance between the first and second side surfaces 310 of the storage structure 300 may be greater than the thickness of the anti-roll structure by about 1% so as to facilitate the insertion of the anti-roll structure 200 into the storage structure 300.

Figure 13:
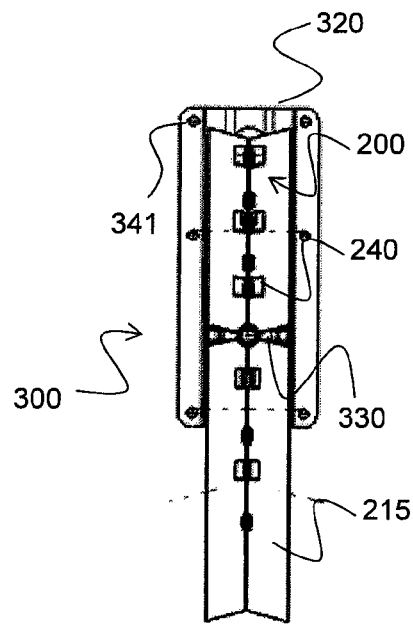
FIG. 13 gives a front view of the anti-roll structure according to this current invention in closed position in the relevant storage structure.

A front view of the anti-roll structure 200 in closed position and stored away in the storage structure 300 is shown in FIG. 13 where the supporting bar 330 is shown. This supporting bar 330 can be made to lie directly on a lateral side of the anti-roll structures 100, 200. In addition or as an alternative, the supporting bar can engage and then be secured to the V-shaped groove on the two sides of the anti-roll structure, so as to prevent the anti-roll structure from moving out of the storage structure 300—or fall down, for example—in a direction parallel to the first and second lateral walls 310. Though FIG. 13 shows the supporting bar engaged to the V-shaped groove of the anti-roll structure 200, it should be clear that the supporting bar can engage a groove of a different section, as for example, a semicircular or elliptical one.

The chock storage structure can be configured in such a way as to be secured to a vehicle with fasteners. For example storage structure 300 can be secured through bolts, rivets, pins or other devices, to the body work of a heavy vehicle like a truck or trailer.

The chock storage structure can also include, on one of its ends, a closure handle 320 designed to be secured to a rear side of the anti-roll structure 200. Advantageously, the closure handle can be secured in a rotational way to a higher end of the storage structure 300, for example, in proximity with the side of the chock storage structure mounted on the vehicle. The closure handle can be U-shaped and be fastened in a way that it can rotate from an open vertical position with respect to the lying surface or ground, to a closed position parallel to the lying surface. In closed position, the closure handle can be fastened to the rear face of the anti-roll structure 200 opposite the chock-shaped end portion. The closure handle prevents the anti-roll structure from slipping and falling from the chock storage structure 300 due to vibrations that the chock storage structure and the anti-roll structure are subjected to when the vehicle is in motion.

The closure grip 320, on securing the anti-roll structure 200 to the storage structure 300, allows the storage of the anti-roll structure in full safety even if the storage structure 300 is fixed to a vehicle horizontally, i.e. parallel to the road surface.

The characteristics of the anti-roll structure described in relation to FIG. 5 and the succeeding figures are clearly feasible and compatible with the anti-roll structure described in relation to FIGS. 3 and 4 and can be used with the same effectiveness in the anti-roll structure described in FIGS. 3 and 4 and vice versa. Likewise, the characteristics described in relation to the embodiment methods referring to any of the figures can be implemented in the methods given in the rest of the figures.

In the same way, the chock storage structure 300 can obviously be used for both anti-roll structures 100 and 200. The anti-roll structures 100, 200 according to this current invention can be entirely made of a metal or a metal alloy, such as aluminium steel, titanium and similar material. Alternatively, the anti-roll structures 100, 200 can be made of plastic material, suitably ribbed and structured or in a compound consisting of a mix of plastics and metal. For example, the support surface and the lying surface of the first and second support elements can be of plastic material, while the core of the support elements can be of metal or metal alloy. Other solutions could be feasible in which the core of the support elements is made of plastic material or carbon while the support and lying surfaces which are in contact with the ground and the tires and thus subject to wear, can be in metal.

What is claimed is:

1. Anti-roll structure for blocking rolling objects, said anti-roll structure comprising:
    a first support element and a second support element respectively comprising a lying surface adapted to be placed on a bearing plane, said lying surface being parallel to said bearing plane, and a support surface, opposed to the lying surface and inclined with respect to said lying surface;
    a junction element lying on a plane perpendicular to the lying surface and to the supporting surface connecting the first and second support elements, wherein
    front end and rear end portions formed on either side of the junction element of the first support element and the second support element, the front end and rear end portions are placeable at a first and second predefined angle with respect to each other by means of the junction element, wherein the first and second predefined angles both have an apex at the junction element.

2. Anti-roll structure according to claim 1, wherein the junction element is a pivot element; and
    the first support element and the second support element are fastened to each other by means of the pivot element and the first support element is pivotable with respect to the second support element about a rotation axis of the pivot element of the first predefined angle.

3. Anti-roll structure according to claim 1, wherein:
    the junction element is inclined with respect to the lying surface so as to abut, with a first end portion, a rolling object to be stopped, and with a second end portion the bearing plane, the junction element being preferably directed so as to be normal to the tangent to a point on the rolling object.

4. Anti-roll structure according to claim 3, wherein:
    the junction element comprises a first anchor element, said anchor element being formed on the second end portion and being adapted to be anchored to the bearing plane.

5. Anti-roll structure according to claim 1, wherein:
    the lying surface of the first and second support element comprises, on a face turnable towards a bearing plane, at least a second anchor element, said at least one anchor element being adapted to be anchored to the bearing plane.

6. Anti-roll structure according to claim 1, wherein:
    the first and second support elements comprise a grip element adapted to be grabbed with a hand, when the support structure is in a closed configuration.

7. Anti-roll structure according to claim 1, further comprising:
    an elastic element arranged between the first and second support elements, said elastic member being adapted to guide rotation of the first support element with respect to the second support element.

8. An anti-roll device for blocking a rolling object comprising:
    a first front end portion and a first rear end portion having a first support surface and a first laying surface supported by a first core extending between the first support surface and the first laying surface;
    a second front end portion and a second rear end portion having a second support surface and a second laying surface supported by a second core extending between the second support surface and the second laying surface; and
    a pivot pin pivotably coupling proximal ends of the first front end portion, the first rear end portion, the second front end portion, and the second rear end portion at a common pivot point,
    wherein first distal ends of the first front end portion and the second front end portion are capable of being separated by a front end distance and second distal ends of the first rear end portion and the second rear end portion are capable of being simultaneously separated by a second rear end distance,
    whereby the anti-roll device is stable when in an open position with the first and second distal ends separated and storable when in a closed position with the first and second distal ends together.

9. The anti-roll device as in claim 8 wherein:
    the pivot pin has a longitudinal axis perpendicular to a point of intersection with the first and second support surfaces and acute on one side and obtuse on another side to a point of intersection with the first and second laying surfaces.

10. The anti-roll device as in claim 8 further comprising:
    a first grove formed between the first front end portion and the first rear end portion adjacent the pivot pin; and
    a second grove formed between the second front end portion and the second rear end portion adjacent the pivot pin;
    whereby the first and second front end portions are capable of being separated by a front predefined angle and the first and second rear end portions are capable of being separated by a rear predefined angle.

11. The anti-roll device as in claim 10 wherein:
    the front and rear predefined angles range from between ten and one hundred and twenty degrees.

12. The anti-roll device as in claim 11 wherein:
    the front and rear predefined angles are each thirty degrees.

13. The anti-roll device as in claim 8 further comprising:
    a storing structure.

14. The anti-roll device as in claim 13 wherein:
    the storing structure comprises,
    a rear side adapted to be attached to a surface;
    parallel side walls extending from the rear side and spaced apart to receive the anti-roll device when in the closed position; and
    a support bar placed on each of the parallel side walls and positioned to be adjacent the pivot pin when the anti-roll device is placed in the storing structure,
    whereby the anti-roll device is securely held within the storing structure.

* * * * *